United States Patent [19]

Sridharan

[11] Patent Number: 5,179,289
[45] Date of Patent: Jan. 12, 1993

[54] CASCADED TRANSFORMERLESS DC-DC VOLTAGE AMPLIFIER WITH OPTICALLY ISOLATED SWITCHING DEVICES

[75] Inventor: Govind Sridharan, Bangalore, India

[73] Assignee: The United States of America as represented by the Administrator of the National Aeronautics and Space Administration, Washington, D.C.

[21] Appl. No.: 791,759

[22] Filed: Oct. 22, 1991

[51] Int. Cl.$^5$ ............................................. H02M 3/07
[52] U.S. Cl. ..................................... 307/110; 363/60
[58] Field of Search ................... 307/110; 363/60, 62

[56] References Cited

U.S. PATENT DOCUMENTS 2,631,249  3/1953  Smith .
4,900,947  2/1990  Weiner et al. ..................... 307/110

Primary Examiner—William H. Beha, Jr.
Attorney, Agent, or Firm—John H. Kusmiss; Thomas H. Jones; Guy M. Miller

[57] ABSTRACT

A very high voltage amplifier in which plural cascaded banks of capacitors are switched by optically isolated control switches so as to be charged in parallel from the preceding stage or capacitor bank and to discharge in series to the succeeding stage or capacitor bank in alternating control cycles. The optically isolated control switches are controlled by a logic controller whose power supply is virtually immune to interference from the very high voltage output of the amplifier by the optical isolation provided by the switches, so that a very high voltage amplification ratio may be attained using many capacitor banks in cascade.

3 Claims, 2 Drawing Sheets

CONTROL SIGNAL TIMING DIAGRAM

CASCADED TRANSFORMERLESS DC-DC VOLTAGE AMPLIFIER WITH OPTICALLY ISOLATED SWITCHING DEVICES

BACKGROUND OF THE INVENTION

1. Technical Field

The invention is related to transformerless DC-DC power converters and in particular to transformerless DC-DC voltage amplifiers having a large voltage gain ratio.

2. Background Art

DC-DC power converters are well-known in the art. Typically, in order to raise a voltage level of a power supply, a bank of capacitors are each charged in parallel with the supply voltage and are then discharged in series to a load. This technique is disclosed in U.S. Pat. No. 4,654,769, for example. Such a device operates in two phases, a first phase during which all the capacitors are charged in parallel while being connected to the supply voltage, and a second phase in which the capacitors are disconnected from the supply voltage and are connected together in series across the load. The voltage increase ratio is equal to the number of capacitors. The foregoing concept is also disclosed in U.S. Pat. No.'s 3,818,309; 4,460,952; 4,321,661; and 4,047,091. In one variation of this technique, several banks of capacitors are charged separately and then all of the capacitors are discharged across the load simultaneously, as disclosed in U.S. Pat. No. 3,579,074. All of the foregoing disclose multiplying the voltage by a factor N equal to the number of capacitors.

A voltage divider may be constructed in a similar manner by reversing the operation, or in other words charging the capacitors in parallel across the supply and discharging them in series across the load, as disclosed in U.S. Pat. No. 3,505,586. As another example of a voltage divider circuit, the dividing ratio is increased by cascading successive stages of capacitor pairs. Each capacitor pair is charged in series by the preceding stage of a capacitor pair and then is discharged in parallel to the succeeding stage of a capacitor pair, as disclosed in U.S. Pat. No. 3,863,135. In this technique, N stages of capacitor pairs provides a voltage reduction of $2^N$.

The present invention is concerned with problems in high voltage amplification in a DC-DC power converter. The problem with the prior art technique of increasing a voltage using a bank of capacitors is that the voltage gain is necessarily limited by a tendency of high voltages to couple through and thereby paralyze the secondary control switching network which regulates the operation of the capacitor bank. Accordingly, devices which increase the voltage by charging the capacitors in parallel and discharging them in series across the load necessarily were limited in the ratio by which the voltage could be raised. Thus, a single bank of capacitors of limited size sufficed to perform a necessarily limited voltage increase function. Because of the tendency of a voltage which has been boosted by several factors of ten to leak or couple through the switching network controlling the capacitors to the supply, it does not seem possible to achieve a large voltage gain and a DC-DC power converter.

Accordingly, it is the object of the present invention to provide a DC-DC power converter which amplifies the voltage with far higher gains than heretofore accomplished in the prior art. It is a further object of the invention to achieve the foregoing without undue leakage of the high voltage back to the power supply through the switching network. It is a further object of the invention to achieve a large voltage gain ratio in such a device without a corresponding increase in the number of capacitors required to be switched.

DISCLOSURE OF THE INVENTION

In the invention, two or more independently charged plural banks of capacitors are controlled by optoelectronic or optically isolated switching devices, rather than conventional switching devices such as field affect transistors or the like. The first bank of capacitors are connected in parallel by the optoelectronic switching devices to an input voltage for a predetermined period of time. The optoelectronic switching devices then connect the first bank of capacitors in series to the second bank of capacitors. The second bank of capacitors is controlled by its own set of optoelectronic switching devices, which at this time connect each of the capacitors in the second bank in parallel across the boosted voltage provided by the now series-connected capacitors of the first bank. After a predetermined amount of time, the capacitors in the second bank have been charged to the boosted voltage level provided by the first bank of capacitors. The optoelectronic switching device controlling the second bank of capacitors then disconnects these capacitors from the first bank and connects them in series across an output load or a successive bank of capacitors which is operated in similar fashion.

The voltage gain ratio achieved in the invention is equal to the product of the number of capacitors in the first bank and the number of capacitors in the second bank. In a tested embodiment of the invention, the first bank had 5 capacitors and the second bank had 8 capacitors, and the overall voltage gain was a factor of 40.

In this tested embodiment, the output of a 90 volt radio battery was boosted to 3,600 volts dc. The optoelectronic control switches were controlled by a 5 volt power supply. Such a large boosted output voltage (several kilovolts) would not be possible using conventional integrated circuit components because of the tendency of such a large voltage to couple through the conventional switching elements to the control power supply, making it impossible to operate the switches properly so that the device would work. However, in accordance with the present invention, a voltage multiplication is achieved without harmful affects from high voltage leakage back to the control circuit power supply, thereby permitting a large voltage multiplication ratio to be achieved.

Another advantage of the invention is that the voltage multiplication ratio does not require a corresponding number of capacitors. Because each bank of capacitors charges a successive bank, the ratio is the product of the numbers of capacitors in the successive banks of capacitors, a significant advantage.

Figure 1:
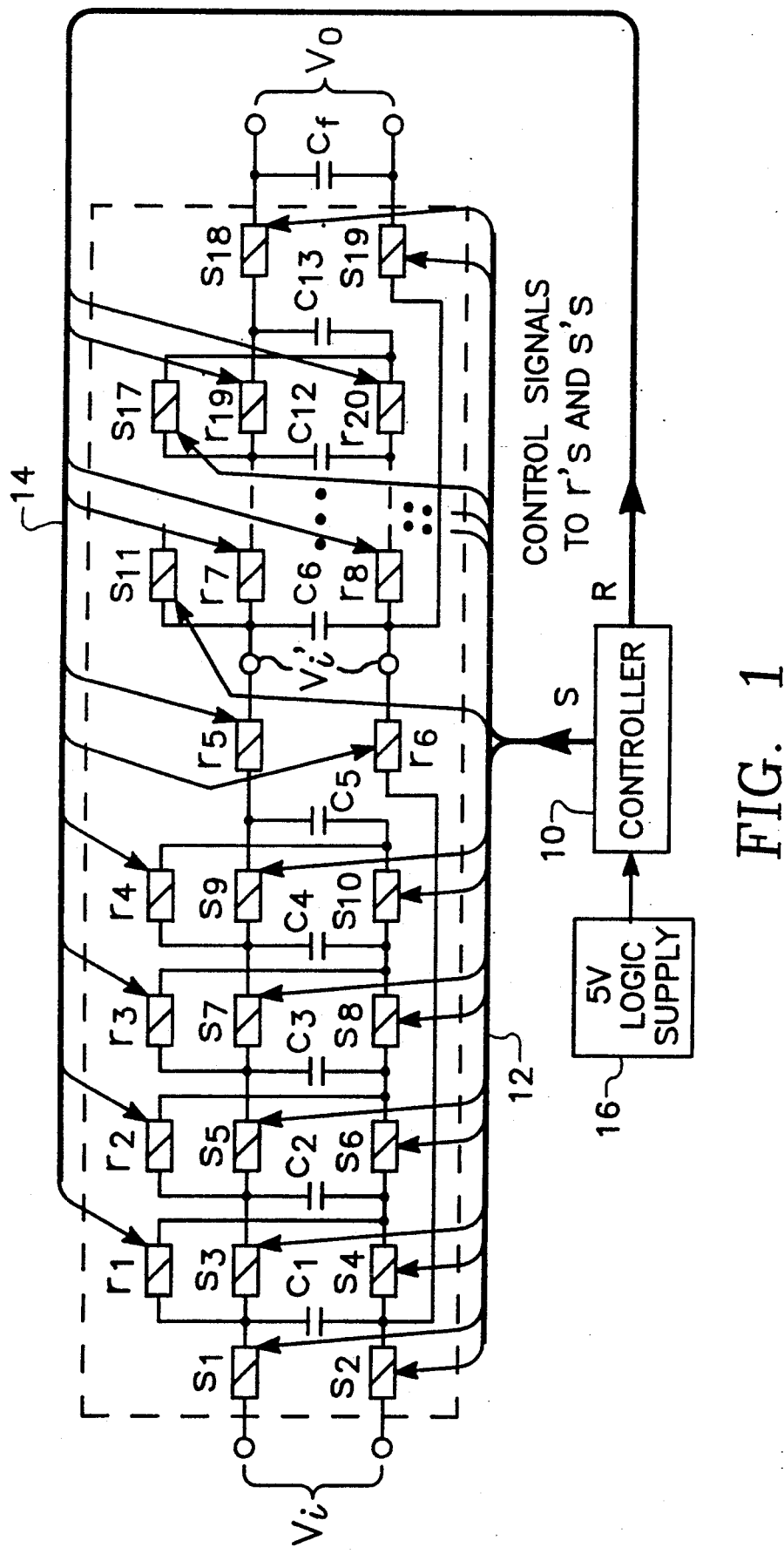
FIG. 1 is a simplified schematic diagram of a DC-DC power converter embodying the invention.

FIG.'s 2a and 2b are contemporaneous timing diagrams of the control signals employed in the embodiment of FIG. 1.

Figure 3:
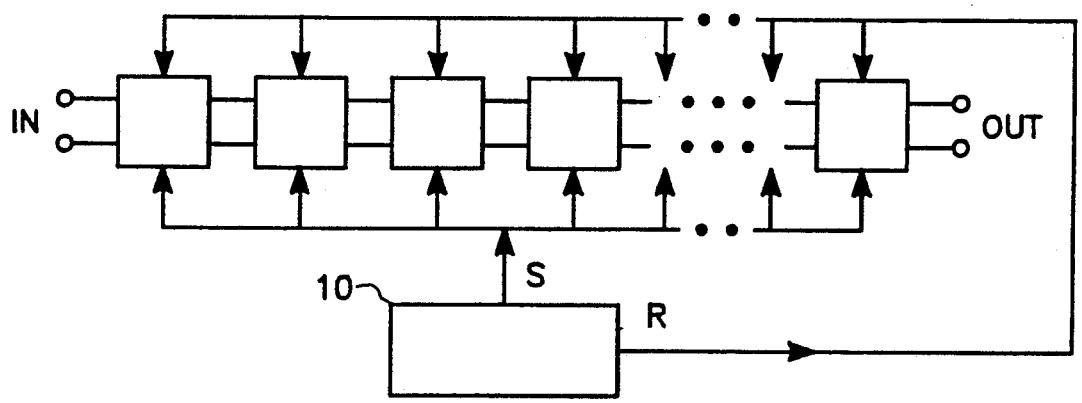

FIG. 3 is a block diagram illustrating the embodiment of the invention employing several stages.

MODES FOR CARRYING OUT THE INVENTION

Referring to FIG. 1, the voltage amplifier of the invention includes a first bank of capacitors $C_1$ through $C_5$ and a second bank of capacitors $C_6$ through $C_{13}$. A set of optically isolated or optoelectronic switches $s_1$ through $s_{10}$ connects respective ones of the capacitors $C_1$ through $C_5$ in the first bank in parallel to two input terminals at an input voltage $V_i$. Another set of optically isolated or optoelectronic switching devices $r_1$ through $r_4$ connects the capacitors $C_1$ through $C_5$ of the first bank in series to two intermediate terminals at an intermediate voltage $V'_i$.

Optically isolated or optoelectronic switches $r_5$ through $r_{20}$ connect the capacitors $C_6$ through $C_{13}$ in parallel across the two intermediate terminals at the intermediate voltage $V'_i$. Optically isolated or optoelectronic switches $s_{11}$ through $s_{19}$ connect the capacitors $C_6$ through $C_{13}$ of the second bank in series across an output terminal pair at an output voltage $V_O$.

An optoelectronic switch controller 10 changes each of the optoelectronic switches $s_1$ through $s_{19}$ and $r_1$ through $r_{19}$ between ON and OFF states. Each of the optoelectronic switches is a three terminal device, two of the terminals comprising electrical current paths connected to corresponding ones of the capacitors $C_1$ through $C_{13}$ and a third terminal comprising control input connected to an output of the controller 10. The S output of the controller 10 is connected to the control inputs of all of the optoelectronic switches $s_1$ through $s_{19}$ by a conductor network 12. The R output of the controller 10 is connected to the control inputs of each of the optoelectronic switches $r_1$ through $r_{19}$ by a conductor network 14.

While the embodiment of FIG. 1 has been described in connection with the controller which outputs electrical control signals to optoelectronic switches which convert these electrical control signals internally to optical signals which are then reconverted back internally and applied as electrical signals to the gates of field effect transistors, the invention instead may use different optoelectronic devices whose control inputs are optical rather than electrical. In this alternative embodiment, the conductor networks 12 and 14 are fiber optic networks, and the controller 10 generates optical signals at its outputs R and S rather than electrical signals, the optical signals having the same wave forms as those illustrated in FIG.'s 2a and 2b.

Each of the optoelectronic switches $s_1$ through $s_{19}$ and $r_1$ through $r_{19}$ is of the type commercially available through a large number of well-known suppliers. Each of these switches has attributes which are well-known in the prior art, need not be described in further detail herein.

The controller 10 receives its power from a 5 volt logic power supply 16. The controller 10 is of the type well-known in the art and generates the control signals on its outputs R and S illustrated in FIG.'s 2a and 2b, respectively. The control signal on the R output of the controller 10 is applied to the control inputs of each of the optoelectronic switching devices $r_1$ through $r_{19}$, while the control signal on the S output of the controller 10 is applied to the control input of each of the optoelectronic switching devices $s_1$ through $s_{19}$.

Within each optoelectronic switching device $r_1$ through $r_{19}$, the control input (as indicated by an incoming arrow head in FIG. 1) is optically coupled to the gate of a field effect transistor controlling the conductance between the electrical terminals of the optoelectronic switch. As illustrated in FIG.'s 2a and 2b, the control signals generated on the controller outputs S and R swing between 0 volts and 5 volts dc. Each control signal is a series of square waves of period 8 ms and duration 3 ms. The square wave outputs R and S of the controller 10 are 180 degrees out of phase. As a result, during a first control cycle of the controller 10, each of the optoelectronic switching devices $s_1$ through $s_{19}$ is rendered conductive between its two electrical terminals while each of the optoelectronic switching devices $r_1$ through $r_{19}$ is rendered nonconductive between its two electrical terminals. Accordingly, the first bank of capacitors $C_1$ through $C_5$ are each connected in parallel across the input voltage $V_i$ while the second bank of capacitors $C_6$ through $C_{13}$ are disconnected from the first bank and are connected in series together across the output $V_O$. During the other control cycle of the controller 10, the optoelectronic switches $s_1$ through $s_{19}$ are nonconductive across their electrical terminals while the optoelectronic switches $r_1$ through $r_{19}$ are conductive across their electrical terminals. Accordingly, the first bank of capacitors $C_1$ through $C_5$ are connected in series across the intermediate port $V'_i$ while the second bank of capacitors $C_6$ through $C_{13}$ are each connected in parallel across the intermediate terminals at the intermediate voltage $V'_i$. At the same time, the first bank of capacitors is disconnected from its input terminal pair at the input voltage $V_i$, while the second bank of capacitors is disconnected from the output terminal pair at the output voltage $V_O$.

In operation, during the first control cycle, the first bank of capacitors $C_1$ through $C_5$ are each charged to the input voltage $V_i$, while the second bank of capacitors $C_6$ through $C_{13}$ are discharged in series across the output terminal pair at the output voltage $V_O$. During the other control cycle, the first bank of capacitors $C_1$ through $C_5$ discharge in series across the intermediate terminal pair at the intermediate voltage $V'_i$, so that the intermediate voltage $V'_i$ is equal to five times the input voltage $V_i$. Simultaneously, each of the capacitors in the second bank $C_6$ through $C_{13}$ is charged to the intermediate voltage $V'_i = 5\,V_i$. Then, during the next control cycle, the original configuration is repeated, so that the capacitors in the second bank $C_6$ through $C_{13}$ are discharged in series across the output terminal pair to produce the output voltage $V_O$. The output voltage is $V_O = 8 \times V'_i = 8 \times 5 \times V_i$.

One important feature of the invention is that the optoelectronic switches $r_5$ and $r_6$ (between the first and second banks of capacitors) are required to have five times the voltage capacity of the switches $s_1$ and $s_2$ connecting the first bank of capacitors to the input voltage $V_i$. Likewise, the optoelectronic switches $s_{18}$ and $s_{19}$ at the output $V_O$ must have eight times the voltage capacity of the switches $r_5$ and $r_6$, or forty times the voltage capacity of the switches $s_1$ and $s_2$. Thus, the switches in each of the stages are required to have progressively higher voltage capacities or isolation capability.

Figure 2A:
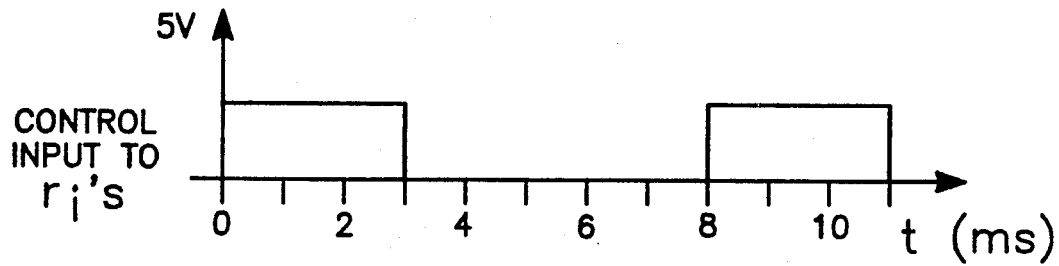
Figure 2B:
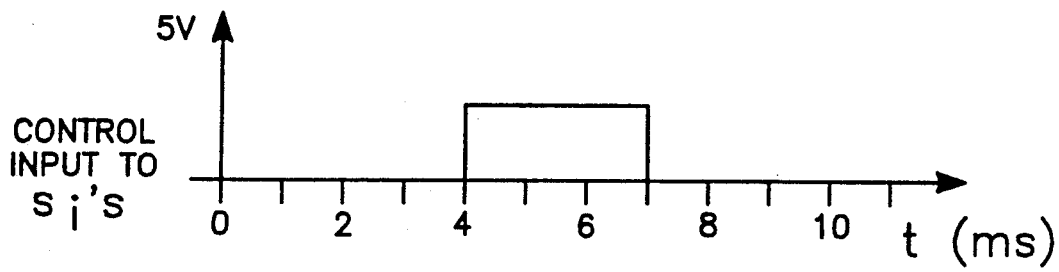

While the embodiment of FIG. 2 is disclosed as having five capacitors in the first bank and eight capacitors in the second bank, actually any number of capacitors could be used in each of the two banks, depending upon the optical electrical isolation capability of the switches employed. Moreover, more than two cascaded banks of capacitors may be employed. For example, referring to FIG. 3, a succession of many capacitor banks identical to the two capacitor banks illustrated in FIG. 1 may be connected in cascade as illustrated in FIG. 3. The controller 10 generates the same control signals S and R as discussed above. In the embodiment of FIG. 3, the optoelectronic switches employed in the "downstream" stages must have proportionately higher voltage isolation capacities than those employed in the beginning stages, as discussed above.

While the invention has been described in detail by specific reference to preferred embodiments thereof, variations and modifications may be made without departing from the true spirit in scope of the invention.

What is claimed is:

1. A DC-DC voltage amplifier, comprising:
   first and second banks of capacitors;
   a first set of optically isolating switches, each of said first set of optically isolating switches comprising a pair of electrical terminals and a control terminal optically isolated from said electrical terminals, said first set of optically isolating switches comprising means for connecting the capacitors of said first bank of capacitors in parallel across a pair of input terminals and for connecting the capacitors in said second bank of capacitors in series across a pair of output terminals;
   a second set of optically isolating switches, each of said second set of optically isolating switches comprising a pair of electrical terminals and a control terminal optically isolated from said electrical terminals, said second set of optically isolating switches comprising means for connecting said capacitors of said first bank of capacitors in series across a pair of intermediate terminals and for connecting the capacitors in said second bank of capacitors in parallel across said intermediate pair of terminals; and
   a controller having first and second controller outputs and comprising means for transmitting first and second control signals on said first and second control outputs respectively, said first and second control signals defining first and second control cycles of said controller, said first controller output being connected to the control inputs of said first set of optically isolating switches and said second control output being connected to the control inputs of said second set of optically isolating switches, whereby during said first control cycle said first bank of capacitors are connected in parallel across said pair of input terminals and said second bank of capacitors are connected in series across said pair of output terminals and during said second control cycle said first bank of capacitors are connected in series across each of said capacitors of said second bank, wherein at least some of the optically isolating switches of said first and second sets of optically isolating switches which are connected to the capacitors in said first bank are characterized by a voltage isolation capacity corresponding at least to a voltage present at said pair of input terminals multiplied by the number of capacitors in said first bank of capacitors, and wherein at least some of said optically isolating switches in said first and second sets of optically isolating switches which are connected to the capacitors in said second bank of capacitors are characterized by a voltage isolation capacity corresponding at least to the voltage of said pair of input terminals multiplied by the number of capacitors in said first bank of capacitors multiplied by the number of capacitors in said second bank of capacitors.

2. The apparatus of claim 1 further comprising a third bank of capacitors, wherein said first set of optically isolating switches comprises means for connecting the capacitors in said third bank of capacitors in parallel across said pair of output terminals and said second set of optically isolating switches comprises means for connecting said capacitors in said third bank of capacitors in series across a pair of second output terminals, whereby to generate a voltage at said second pair of output terminals equal to the voltage of said pair of input terminals multiplied by the number of capacitors in said first bank multiplied by the number of capacitors in said second bank multiplied by the number of capacitors of said third bank.

3. The apparatus of claim 1 wherein said means for connecting said control outputs to the control inputs of said optically isolating switching devices comprise first and second fiber optic networks corresponding to said first and second sets of optically isolating switching devices, and wherein said control signals generated by said controller comprise optical signals.

* * * * *